United States Patent
Takahara

(10) Patent No.: US 7,628,040 B2
(45) Date of Patent: Dec. 8, 2009

(54) METHOD FOR JOINING AN OPTICAL FIBER AND AN OPTICAL LENS

(75) Inventor: Toshiaki Takahara, Chofu (JP)

(73) Assignees: Juki Corporation, Tokyo (JP); Citizen Holdings Co., Ltd., Tokyo (JP); Kabushiki Kaisha Ohara, Kanagawa (JP); Kabushiki Kaisha Topcon, Tokyo (JP)

(*) Notice: Subject to any disclaimer, the term of this patent is extended or adjusted under 35 U.S.C. 154(b) by 572 days.

(21) Appl. No.: 10/947,679

(22) Filed: Sep. 23, 2004

(65) Prior Publication Data

US 2005/0183460 A1     Aug. 25, 2005

(30) Foreign Application Priority Data

Feb. 23, 2004  (JP)  .............. 2004-046189

(51) Int. Cl.
  *C03B 37/07*  (2006.01)
  *G02B 6/255*  (2006.01)

(52) U.S. Cl. .............. 65/384; 65/387; 65/407; 65/501

(58) Field of Classification Search ........... 65/407, 65/387, 384, 501
See application file for complete search history.

(56) References Cited

U.S. PATENT DOCUMENTS

| | | | | |
|---|---|---|---|---|
| 4,822,136 A * | 4/1989 | Hicks, Jr. | ............... | 385/142 |
| 4,877,300 A * | 10/1989 | Newhouse et al. | ............ | 385/43 |
| 4,954,152 A * | 9/1990 | Hsu et al. | ............ | 65/392 |
| 4,962,988 A | 10/1990 | Swann | | |
| 4,986,620 A * | 1/1991 | Severijns et al. | ............ | 385/15 |
| 5,221,309 A * | 6/1993 | Kyoto et al. | ............ | 65/416 |
| 5,235,662 A * | 8/1993 | Prince et al. | ............ | 385/129 |
| 5,293,438 A | 3/1994 | Konno et al. | | |
| 5,384,874 A * | 1/1995 | Hirai et al. | ............ | 385/34 |
| 5,457,759 A * | 10/1995 | Kalonji et al. | ............ | 385/31 |
| 5,551,968 A * | 9/1996 | Pan | ............ | 65/387 |
| 5,889,904 A | 3/1999 | Pan et al. | | |
| 6,009,220 A * | 12/1999 | Chan et al. | ............ | 385/24 |
| 6,178,779 B1 * | 1/2001 | Drouart et al. | ............ | 65/391 |
| 6,453,090 B1 * | 9/2002 | Conde et al. | ............ | 385/33 |
| 6,520,689 B2 * | 2/2003 | DeMartino et al. | ............ | 385/98 |
| 6,553,791 B1 * | 4/2003 | Osaka et al. | ............ | 65/407 |
| 6,802,190 B2 * | 10/2004 | Reed et al. | ............ | 65/377 |
| 6,979,136 B2 | 12/2005 | Takagi et al. | | |
| 2003/0056547 A1 * | 3/2003 | Yamada et al. | ............ | 65/407 |
| 2004/0208443 A1 | 10/2004 | Burkhard et al. | | |

FOREIGN PATENT DOCUMENTS

| | | |
|---|---|---|
| JP | 2003-515757 | 5/2003 |
| JP | 2003-528347 | 9/2003 |
| JP | 2003-344709 | 12/2003 |
| WO | WO 01/38913 A2 | 5/2001 |
| WO | WO 01/71403 A1 | 9/2001 |
| WO | WO 02/099485 A2 | 12/2002 |
| WO | WO 03/003090 A1 | 1/2003 |

* cited by examiner

*Primary Examiner*—John Hoffmann
(74) *Attorney, Agent, or Firm*—Merchant & Gould P.C.

(57) ABSTRACT

In the jointing method of jointing an optical fiber F a softening point of which is higher than an optical lens L to the optical lens L, only the optical lens is softened by heating, and an end face as a joint portion of the optical fiber is pushed into a joint portion of the softened optical lens to thereby joint them.

7 Claims, 6 Drawing Sheets

METHOD FOR JOINING AN OPTICAL FIBER AND AN OPTICAL LENS

The present invention claims foreign priority to Japanese patent application No. JP.2004-046189, filed in the Japanese Patent Office on Feb. 23, 2004 the contents of which are incorporated herein by reference.

BACKGROUND OF THE INVENTION

1. Field of the Invention

The present invention relates to a method for jointing an optical fiber and an optical lens, an apparatus for the same and an optical module.

2. Description of the Related Art

As one of basic modules used in the optical communication, there is the fiber collimator. The fiber collimator is the module in which the optical fiber and the lens are integrated together, and used to execute the emittance and incidence of the beam in response to the lens characteristics.

Heretofore, in manufacturing such fiber collimator, the end portion of the optical fiber and the lens are jointed by using the adhesive. More particularly, the fiber is passed previously through the tubular guide called the capillary or the ferrule before jointing, then the fiber is fixed under the condition that end portions of the tubular guide and the fiber are aligned, then a tip of the fiber is polished to consist with an end face of the guide, and then the optical fiber together with the guide is jointed to the lens while matching the optical axis of the lens with the optical axis of the fiber.

Also, such a structure is proposed that the optical fiber and the lens are arranged to provide a space between the end face of the optical fiber and the end face of the lens and then jointed without the adhesive (see U.S. Pat. No. 5,889,904). In this case, an antireflection coating is coated on the end face of the lens to satisfy the optical characteristics, and then the optical fiber and the lens are fixed after their positional relationship is adjusted.

However, in the structure that the optical fiber and the lens are jointed by using the adhesive, such adhesive absorbs a part of the passing light. Therefore, when the high-intensity light is incident, in some cases the temperature rise is caused and thus the adhesive is altered in quality and also the optical characteristics are deteriorated.

Normally, the absorption of the optical adhesive is about 1 to 5% in the wavelength range used in the optical communication. The change in quality is caused in the adhesive that has tolerance for the high temperature when the temperature exceeds about 400 degree centigrade. However, the adhesive having such tolerable temperature range cannot withstand the light intensity of up to several [W] class.

Also, according to the jointing approach using the above adhesive, since the optical fiber is held onto the guide such as the capillary and then the polishing operation is required to register both end faces, there existed the problems that the work becomes troublesome and also a product cost is increased.

In addition, in the case where the two-core fiber (two single-core fibers and the two-core tape fiber) is jointed to the collimator lens, respective fibers are inserted into the holed guide (capillary, or the like) having two holes or one hole therein, then two fibers are secured by the adhesive or the like in the state that two fibers are kept close, and then the end faces of the fibers together with the guide are polished to align the end faces. This is because two fibers cannot be jointed with a small loss unless their end faces are aligned with good precision, and because reduction in size of the structure cannot be achieved if two fibers are parted from each other.

Also, as shown in U.S. Pat. No. 5,889,904, in the case of the method of jointing the optical fiber and the lens to provide the clearance space between them, such a disadvantage existed that it is possible that the optical characteristics are deteriorated because of a foreign matter entered between the end faces.

Also, since their end faces are not fixed mutually by the adhesive, or the like, another structure is needed to fix their positional relationship and still maintain such positional relationship after the jointing is completed. Therefore, such disadvantages existed that increase in the number of articles and the number of working process is brought about and also it is difficult to attain a lower cost and a smaller size.

Also, since the antireflection coating on respective end faces of the fiber and the lens is needed, such disadvantages existed that a higher cost is caused and also the optical characteristics are influenced by the light resistance of the antireflection coating.

SUMMARY OF THE INVENTION

It is an object of the present invention to attain easy jointing between the optical fiber and the optical lens without intervention of an air layer or an adhesive between them.

The first aspect of the present invention provides a method for jointing an optical fiber with an optical lens, having the steps of:

softening only the optical lens by heating;

pushing an end portion of the optical fiber into a joint portion of the optical lens to thereby joint the optical fiber to the optical lens;

wherein the softening point of the optical fiber is higher than the softening point of the optical lens.

According to the above method, firstly, the joint portion of the optical lens is heated and softened. As described above, because the softening temperature of the optical fiber is higher than the optical lens, both joint portions of the optical lens and the optical fiber may be heated simultaneously at the temperature that is higher than the softening temperature of the optical lens but below the softening temperature of the optical fiber, otherwise only the joint portion of the optical lens may be heated.

Then, the end portion of the optical fiber as the joint portion is pushed against the joint portion of the softened optical lens. Since the optical lens is softened, the end portion of the optical fiber is pushed into the optical lens side to sink thereinto. Then, the optical lens holds the end portion of the optical fiber from its surrounding area when the optical lens is cooled, so that the mutual joint can be achieved.

According to a second aspect of the present invention according to the first aspect of the present invention, it is preferable that the end portion of the optical fiber and the joint portion of the optical lens are arranged to be opposed to each other, and the optical lens is softened by a heat source that is located apart from the joint portion of the optical lens to a side of the optical fiber.

According to a third aspect of the present invention according to the second aspect of the present invention, it is more preferable that the heat source is an arc discharge.

According to the above method, the heating point by the arc discharge is separated from the jointed portion of the optical lens, and then the jointed portion of the optical lens is heated at the temperature in response to the separated distance.

According to a fourth aspect of the present invention according to the second aspect of the present invention, it is advantageous that the heat source is located apart from the optical fiber and the optical lens in a radial direction of axis of the optical fiber.

According to a fifth aspect of the present invention according to the first aspect of the present invention, it is further advantageous that the method has a step of softening the end portion of the optical fiber so as to obtain a rounded surface thereon before softening the optical lens.

According to a sixth aspect of the present invention according to the first aspect of the present invention, it is desirable that the method further has steps of:

applying a tensile force on the jointed optical fiber and the optical lens in a direction to stretch the optical fiber and the optical lens; and inspecting a jointed condition between the optical lens and the optical fiber based on the tensile force applied thereto.

According to a seventh aspect of the present invention, there is provided an apparatus for jointing an optical fiber and an optical lens, having:

a lens holding mechanism for holding the optical lens;
a fiber holding mechanism for holding the optical fiber;
a heating unit and
a heating-position adjusting mechanism which adjusts a distance between a target heating-position and a joint portion of the held optical fiber.

The softening point of the optical fiber is higher than the softening point of the optical lens, and the lens holding mechanism and the fiber holding mechanism are arranged in such a manner that a joint portion of the optical lens and the joint portion of the optical fiber are opposed to each other.

According to the above configuration, the joint portion of the optical lens and the end face as the joint portion of the optical fiber are supported by the lens holding mechanism and the fiber holding mechanism respectively to oppose to each other. Then, the position that is apart appropriately from the joint portion of the held optical lens is selected as the target heating position by the heating-position adjusting mechanism, then the heating is executed by the heating unit, and then the joint portion of the optical lens can be heated appropriately and softened. Then, the optical fiber or the optical lens is moved relatively to push the end portion of the optical fiber into the joint portion of the optical lens, so that the mutual joint can be achieved.

According to an eighth aspect of the present invention according to the seventh aspect of the present invention, it is preferable that the fiber holding mechanism has:

a first fiber holder which holds the optical fiber at an area near to the end portion as the joint portion of the optical fiber, the first fiber holder being capable of fastening and releasing the optical fiber;

a second fiber holder that holds the optical fiber at an area other than the joint portion; and a holder-position adjusting mechanism which moves at least any one of the first fiber holder and the second fiber holder in a direction to deviate from an axis of the optical fiber.

The above configuration is suitable for the case where the two-core optical fiber is jointed to the optical lens. Such two-core optical fiber is held in a state that the core wires each consisting of the core and the cladding are covered with one tubular covered wire. Both core wires are held in the inside of the covered wire such that their positions can be shifted along the longitudinal direction of the covered wire.

Such two-core optical fiber is held by the respective fiber holders at the end portion on the jointing side and in the position except the end portion. Then, when the end portion of the optical fiber is held loosely (in a state that the optical fiber is not fastened) by the first fiber holder and then any one of the first and second fiber holders is moved by the holder-position adjusting mechanism in the direction to deviate the holder from the axis of the optical fiber, the deflection occurs in the optical fiber. According to such deflection, end positions of two core wires are varied relatively in response to their positional relationship in the covered wire. Any one of the first and second fiber holders is moved/adjusted in answer to such variation such that the positions of the end portions of the core wires agree with each other, and then the core wires in the covered wire are fixed by fastening the first fiber holder after the positions of the end portions are trued up mutually. Then, the optical fiber is jointed to the optical lens by heating/softening the jointed portion of the optical lens and then pushing the end portion of the optical fiber into the softened optical lens.

According to a ninth aspect of the present invention according to the seventh aspect of the present invention, it is preferable that the apparatus further has:

a joint-strength inspecting mechanism including:

a tensile force applying unit which applies a tensile force by moving at least any one of the lens holding mechanism and the fiber holding mechanism in a direction to stretch the optical fiber and the optical lens; and an inspecting unit which inspects a jointed condition between the optical lens and the optical fiber based on the tensile force applied thereto.

According to the above configuration, the tensile force is applied to separate the optical fiber from the optical lens after the optical fiber is jointed to the optical lens. Thus, it is understood that, when the tensile force exceeds a predetermined value, the optical fiber is jointed to the optical lens with the sufficient jointing strength. Also, it is understood that, when the tensile force does not exceed the predetermined value, the defective jointing state where the optical fiber is separated from the optical lens is brought about.

According to a tenth aspect of the present invention according to the seventh aspect of the present invention, it is more preferable that the apparatus further has an operation controlling unit that executes heating again by the heating unit in accordance with information obtained from the joint-strength inspecting mechanism.

According to the above configuration, if it is decided by the joint-strength inspecting mechanism that the jointing is defective, the heating unit and the heating-position adjusting mechanism are driven by the operation controlling unit. Thus, the jointed portion of the optical lens is heated again in the predetermined position, and the optical fiber is jointed once again after the optical lens is softened.

According to an eleventh aspect of the present invention according to the seventh aspect of the present invention, it is more preferable that the apparatus further has:

a heating controlling unit which performs a heat control by the heating unit to the end portion of the optical fiber, the heat control being performed at a joint portion side until reaching a softening temperature thereof, before the heating the optical lens in order to joint the optical fiber and the optical lens.

According to the above configuration, since the jointed end portions of the optical fiber is heated in advance up to the softening temperature, the end portions of the optical fiber can be deformed from the flat end face to the curved surface. Thus, the diffused reflection of the return light by the edge reflection of the optical fiber can be generated and the degradation of the optical characteristics can be suppressed.

Also, since a part of two aligned core wires is melted in the two-core optical fiber to enter into the space between the core wires, two core wires can be pasted together by the capillary phenomenon.

According to a twelfth aspect of the present invention according to the seventh aspect of the present invention, it is advantageous that the apparatus further has:

a lens holder driving mechanism that drives the lens holder mechanism and the optical lens together in a direction of a light axis of the optical lens.

According to a thirteenth aspect of the present invention according to the eighth aspect of the present invention, it is more advantageous that the apparatus further has:

a fiber guiding mechanism that moves the optical fiber in a direction of forward and backward in respect to the optical lens via the first and second fiber holder.

According to a fourteenth aspect of the present invention according to the ninth aspect of the present invention, wherein the tensile force applying unit has an actuator controlled by electric to move at least one of the lens holding mechanism and the fiber holding mechanism in linear direction.

According to a fifteenth aspect of the present invention, there is provided an optical module which is used for executing an emittance and an incidence of a beam, comprising:

an optical fiber; and optical lens, wherein the optical module is manufactured by a process comprising the steps of:

softening only the optical lens by heating;

pushing an end portion of the optical fiber into a joint portion of the optical lens to thereby joint the optical fiber to the optical lens;

wherein the softening point of the optical fiber is higher than the softening point of the optical lens.

According to a sixteenth aspect of the present invention according to the fifteenth aspect of the present invention, wherein the end portion of the optical fiber and the joint portion of the optical lens are arranged to be opposed to each other, and the optical lens is softened by a heat source that is located apart from the joint portion of the optical lens to a side of the optical fiber.

According to a seventeenth aspect of the present invention according to the sixteenth aspect of the present invention, wherein the heat source is an arc discharge.

According to an eighteenth aspect of the present invention according to the sixteenth aspect of the present invention, wherein the heat source is located apart from the optical fiber and the optical lens in a radial direction of axis of the optical fiber.

According to a nineteenth aspect of the present invention according to the fifteenth aspect of the present invention, wherein the optical module is manufactured by a process including the steps of:

softening the end portion of the optical fiber so as to form a rounded surface thereon before softening the optical lens.

According to a twentieth aspect of the present invention according to the fifteenth aspect of the present invention, wherein the optical module is manufactured by a process comprising the steps of:

applying a tensile force on the jointed optical fiber and the optical lens in a direction to stretch the optical fiber and the optical lens; and inspecting a jointed condition between the optical lens and the optical fiber based on the tensile force applied thereto.

DETAILED DESCRIPTION OF THE PREFERRED EMBODIMENTS

Overall Configuration of the Embodiment

Figure 1:
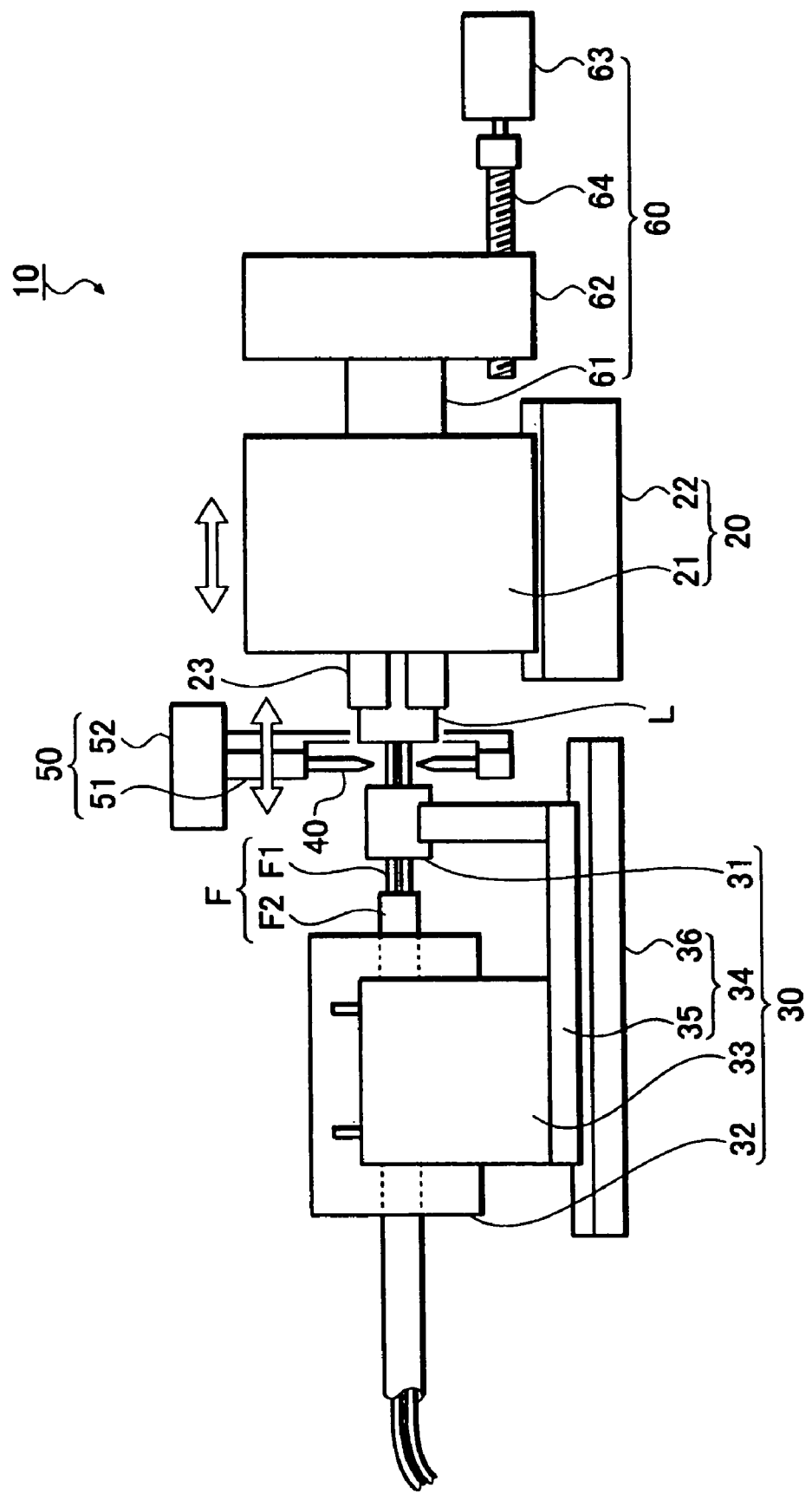
FIG. 1 is a schematic configurative view of an apparatus for jointing an optical fiber and an optical lens according to an embodiment of the present invention.

A jointing apparatus 10 of an optical fiber F and an optical lens L as an embodiment of the present invention will be explained with reference to FIG. 1 to FIG. 6 hereinafter. FIG. 1 is a schematic configurative view of the jointing apparatus 10.

Here the optical fiber F as one object that is jointed by the jointing apparatus 10 is a two-core optical fiber, and core wires F1 each comprising of a core and a cladding are covered with one tubular covered wire F2 and held. Both core wires F1 are held in the inside of the covered wire F2 such that their positions can be shifted along the longitudinal direction of the covered wire F. Then, one end faces of respective core wires F1 in the optical fiber F serve as jointed portions to the optical lens L. Also, as the material of the core wires F1, the optical fiber F employs a quartz glass whose softening point by the heat is about 1700 degree centigrade.

The optical lens L as the other object that is jointed by the jointing apparatus 10 is a collimator lens, and its one end face serves as a joint portion to the optical fiber F. Also, as the material, the optical lens L employs a multi-component glass whose softening point by the heat is about 400 to 600 degree centigrade.

The jointing apparatus 10 comprises a lens holding mechanism 20 for holding the optical lens L, a fiber holding mechanism 30 for holding the optical fiber F, a heating unit 40 for heating the optical lens L, a heating-position adjusting mechanism 50 for adjusting a distance from a target heating positions of the heating unit 40 to the joint portion of the held optical lens L, a joint-strength inspecting mechanism 60 for applying a tensile force via at least any one of the lens holding mechanism 20 and the fiber holding mechanism 30 in the direction to separate the optical fiber F and the optical lens L and also inspecting the jointed condition between the optical lens L and the optical fiber F according to the tensile force required at that time, and an operation controlling unit 90 for controlling respective operations of the above structure. Then, respective portions will be explained hereunder.

(Lens Holding Mechanism)

The lens holding mechanism 20 includes a lens holder 21 for holding the optical lens L, and a lens-side slide guide mechanism 22 for supporting the lens holder 21 movably in the predetermined one axial direction.

The lens holder 21 has a pair of holding frames 23 each having a shape that is obtained by splitting a cylindrical body into two parts along a centerline, and fastening screws (not shown) for fastening respective holding frames 23. Thus, the optical lens L is put between the holding frames 23 by tightening the fastening screws.

The lens-side slide guide mechanism 22 holds the lens holder 21 movably along one horizontal axial direction in a state that the jointing apparatus 10 is installed on the horizontal plane. At this time, the lens-side slide guide mechanism 22 holds the lens holder 21 such that the optical axis of the optical lens L held by the lens holder 21 coincides with the one axial direction along which the lens holder 21 can be moved. In other words, the optical lens L is held by the lens holding mechanism 20 to move in parallel with the optical axis in a state that the optical axis is kept in the horizontal direction.

(Joint Strength Inspecting Mechanism)

The joint-strength inspecting mechanism 60 includes a tension sensor 61 for sensing the tensile force applied to the held optical lens L, a moving member 62 connected to the lens holder 21 via the tension sensor 61, a driving motor 63 as a driving source for applying a moving force to the moving member 62 in the direction to render the optical lens L away from the optical fiber F, and a ball screw 64 for converting a turning driving force of the driving motor 63 into a moving force applied to the moving member 62.

The tension sensor 61 senses an infinitesimal displacement between the lens holder 21 and the moving member 62, and outputs the displacement to the operation controlling unit 90. Then, the operation controlling unit 90 can calculate the tensile force between the lens holder 21 and the moving member 62 based on the sensed displacement.

The driving motor 63 is arranged in such a way that a centerline of the turning driving shaft coincides with the moving direction of the lens holder 21. The turning driving shaft is coupled with the screwed shaft of the ball screw 64. Then, the ball screw 64 engages with the moving member 62 to move the moving member 62 along its centerline direction by the turning driving of the driving motor 63. In other word, the drive of the driving motor 63 causes the moving member 62 to move away from the lens holder 21 via the ball screw 64, and as a result the tensile force can be applied in the direction along which the optical lens L goes away from the optical fiber F.

(Fiber Holding Mechanism)

The fiber holding mechanism 30 includes a first fiber holder 31 for holding predetermined portions of the core wires F1 of the optical fiber F near their end faces on the joint portion side, a second fiber holder 32 for holding the optical fiber F in positions except the joint portion, a holder-position adjusting mechanism 33 for moving the second fiber holder 32 in the direction along which such second fiber holder 32 is deviated from the axis of the optical fiber F, and a fiber-side slide guide mechanism 34 for moving the optical fiber F via the first and second fiber holders 31, 32 in the direction along which the optical fiber F comes up to and goes away from the optical lens L.

Figure 2:
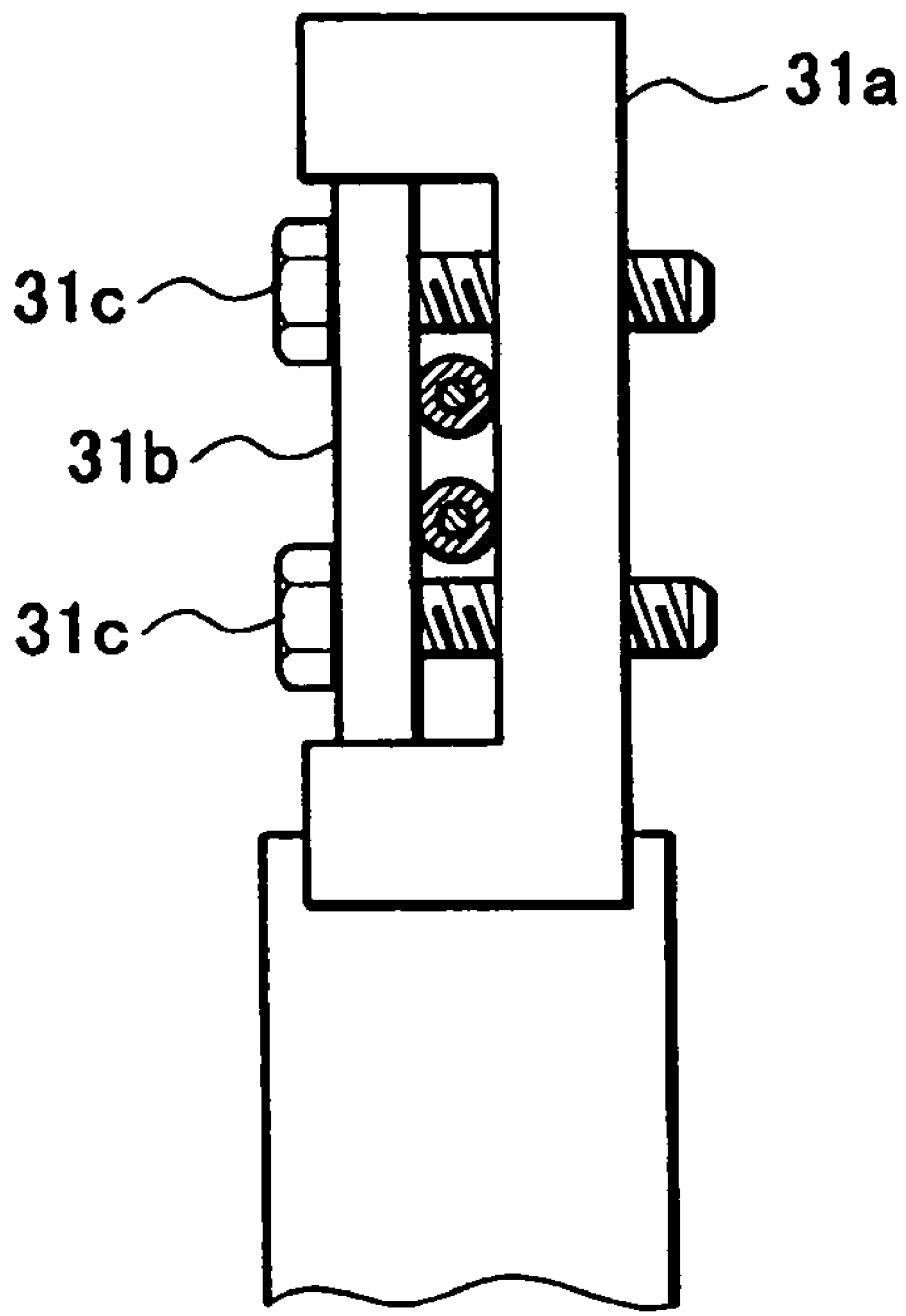
FIG. 2 is a partial enlarged view showing a state viewed along the direction in which a first fiber holder is mated with a centerline of the optical fiber.

FIG. 2 is a partial enlarged view showing a state viewed along the direction in which the first fiber holder 31 is mated with the centerline of the optical fiber F. In other words, the fiber holding mechanism 30 holds the optical fiber F by the first fiber holder 31 and the second fiber holder 32 in such a manner that the overall direction of the optical fiber F is held horizontally in parallel with the optical axis of the optical lens L held as above.

As shown in FIG. 2, the first fiber holder 31 has frame member 31a, 31b for forming a fiber holding clearance along the vertical direction and the horizontal direction (the direction along the optical axis of the optical lens L that is in its held state), and fastening screws 31c for adjusting a clearance distance between the frame member 31a, 31b. In the first fiber holder 31 constructed as above, two core wires F1 of the optical fiber F are inserted into the clearance between the frame member 31a, 31b to be aligned vertically, then the registration of the end faces of the core wires F1 is executed in a state that two core wires F1 are held loosely (in a state that the position of each core wire F1 can be adjusted in its longitudinal direction), and then the core wires F1 are fixed by the fastening screws 31c not to move after the registration. Then, the jointing operation to the optical lens L is carried out under such condition.

A though hole through which the covered wire F2 of the optical fiber F is passed is formed in the second fiber holder 32 in parallel with the optical axis of the optical lens L that is in the held state. Thus, the second fiber holder 32 holds the optical fiber F in a situation that the optical fiber F can be moved along the through direction.

The holder-position adjusting mechanism 33 is a slider mechanism for supporting the second fiber holder 32 such that the second fiber holder 32 can be moved and positioned along the vertical direction. The moving direction of the optical fiber F in the holder-position adjusting mechanism 33 may be set in any direction that does not agree with the longitudinal direction of the optical fiber F. But it is desired that the aligned direction of two core wires F1 by the first fiber holder 31 should be set to agree with the moving direction of the optical fiber F.

FIG. 3 is an explanatory view showing the alignment operation between top end faces of respective core wires F1 of the optical fibers F by the holder-position adjusting mechanism 33.

Figure 3A:
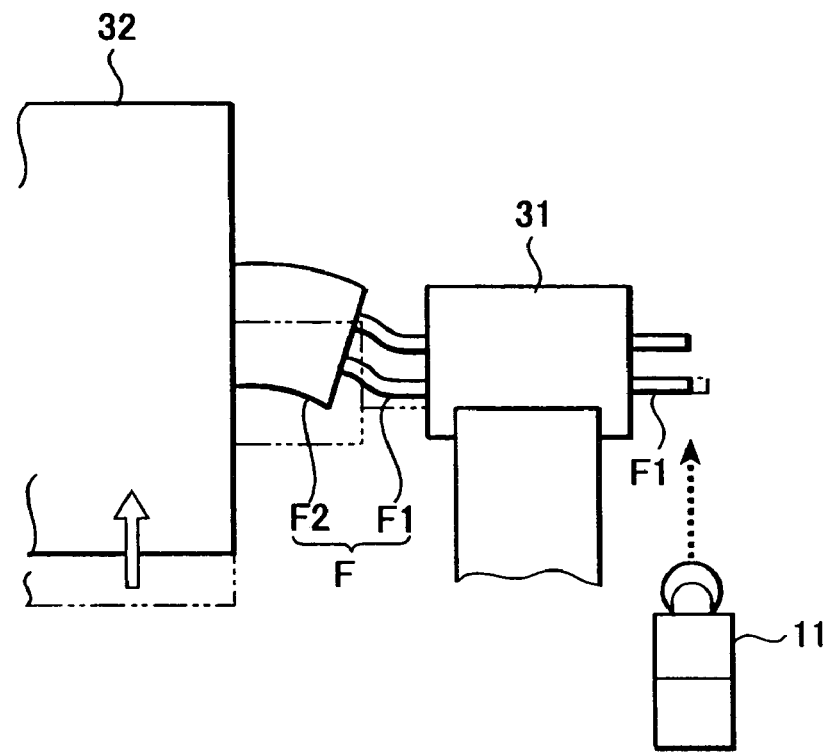
FIG. 3A is an explanatory view showing an alignment operation between top end faces of respective core wires of the optical fibers by a holder-position adjusting mechanism in the case where a lower core wire is protruded.
Figure 3B:
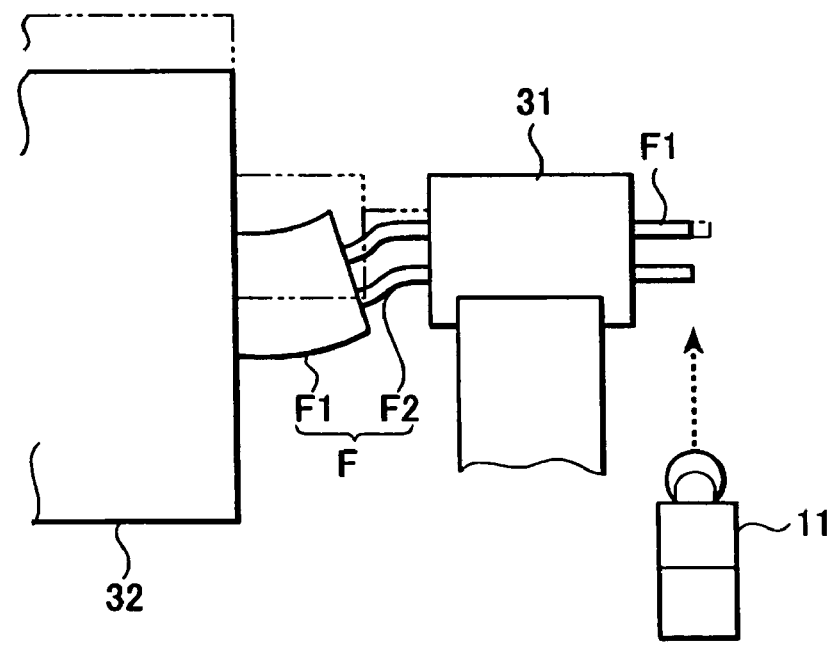
FIG. 3B is an explanatory view showing an alignment operation between top end faces of respective core wires of the optical fibers by the holder-position adjusting mechanism in the case where an upper core wire is protruded.

As shown in FIG. 3A, in the case where the lower core wire F1 is protruded toward the optical lens L side (illustrated by a chain double-dashed line), the lower core wire F1 is pulled and drawn back when the second fiber holder 32 is moved upward. Also, as shown in FIG. 3B, in the case where the upper core wire F1 is protruded toward the optical lens L side (illustrated by a chain double-dashed line), the upper core wire F1 is pulled and drawn back when the second fiber holder 32 is moved downward.

Therefore, positions of the top end faces of two core wires F1 can be mated with each other by positioning the second fiber holder 32 at an appropriate height.

In this case, because the core wires F1 of the optical fiber F are fine, a camera 11 for picking up images of the positions of the top end faces of respective core wires F1 is provided. Then, the alignment of the top end positions is carried out while watching the picked-up image that is displayed in an enlarged manner.

Also, the second fiber holder 32 is supported movably in the vertical direction by the holder-position adjusting mechanism 33. But the first fiber holder 31 may be supported movably in the vertical direction, or both fiber holders 31, 32 may be supported movably in the vertical direction. That is to say, the second fiber holder 32 may be moved relatively with respect to the first fiber holder 31 in the opposite direction to the protruded core wire F1.

The fiber-side slide guide mechanism 34 has a slider 35 for holding the first fiber holder 31 and the second fiber holder 32, and a longitudinally moving mechanism 36 for driving the slider 35 along the horizontal direction (the optical axis direction of the held optical lens L) to position it.

As described above, the optical lens L is fastened to the first fiber holder 31 in a state that the registration of the top ends of the core wires F1 is completed, and then the overall optical fiber F is moved by the slider 35 in the horizontal direction to adjust the position in a state that the optical fiber F is supported by the fiber holders 31, 32.

In other words, the operation of the longitudinally moving mechanism 36 is controlled by the operation controlling unit 90. Thus, the optical fiber F is positioned at a heating position when curved surfaces of the core wires F1 of the optical fiber F are formed described later, or the optical fiber F is moved and positioned at a predetermined pushing-in position when the core wires are pushed into the optical lens L.

(Heating Unit and Heating Position Adjusting Mechanism)

The heating unit 40 is a structure for executing the so-called arc welding. The heating unit 40 has a pair of arc-discharge electrodes whose top end portions are arranged in the vertical direction to oppose to each other, and a current supplying circuit (not shown) for supplying the discharge current.

Also, the heating-position adjusting mechanism 50 has a frame member 51 for holding a pair of arc-discharge electrodes, and a moving mechanism 52 for moving the frame member 51 in the horizontal direction (the direction along the optical axis of the held optical lens L) to position it.

Mutual top ends of a pair of arc-discharge electrodes are separated at a distance within which the optical fiber F can be arranged, and positions between the mutual top ends of the electrodes are the target heating positions. Then, the arc-discharge electrodes are held by the heating-position adjusting mechanism 50 such that the clearance between the top end portions of the electrodes is kept at the same height as the held optical fiber F.

The heating-position adjusting mechanism 50 moves the frame member 51, which holds a pair of arc-discharge electrodes while maintaining their opposed state, in the horizontal direction by the moving mechanism 52 to position it. Thus, a separated distance of the target heating positions from the jointed portion of the optical lens L can be adjusted, and an amount of heat applied to the jointed portion of the optical lens L can be adjusted while keeping the current value supplied to the arc-discharge electrodes constant. In this case, the moving/positioning of the arc-discharge electrodes to the moving mechanism 52 via the frame member 51 can be controlled by the operation controlling unit 90.

(Control System for Jointing Apparatus)

Figure 4:
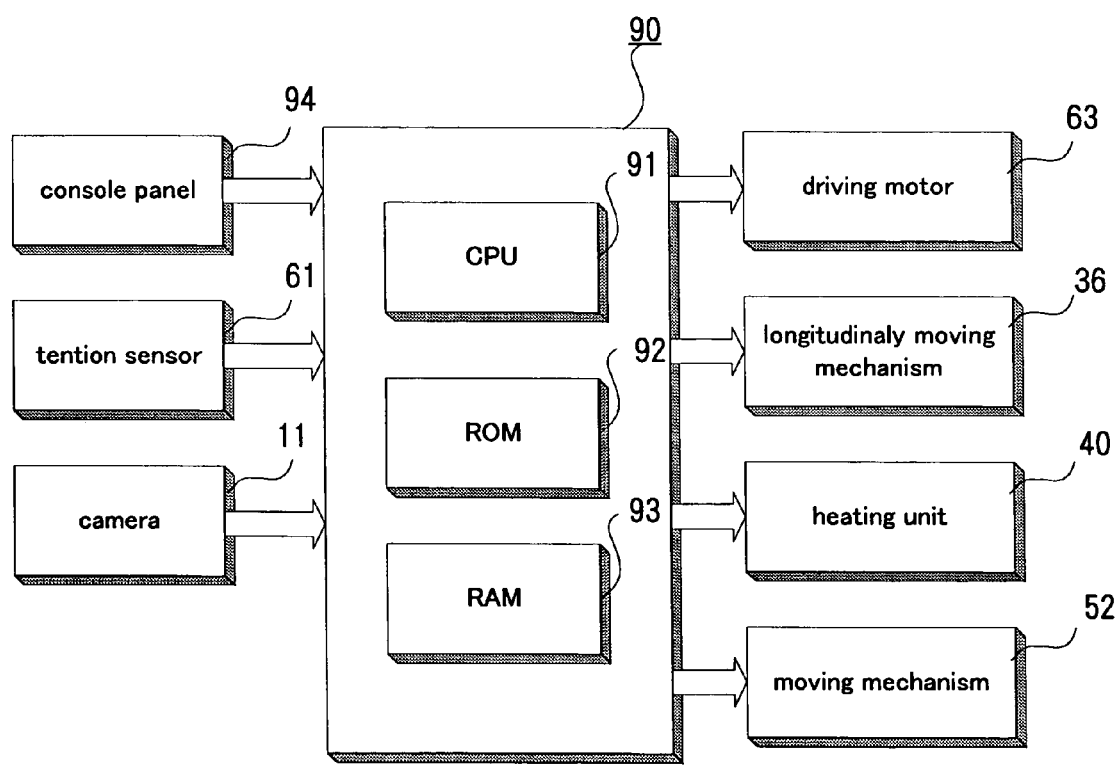
FIG. 4 is a block diagram showing a control system of the apparatus for jointing the optical fiber and the optical lens.

FIG. 4 is a block diagram showing a control system of the jointing apparatus 10 of the optical fiber and the optical lens. As shown in FIG. 4, the operation controlling unit 90 has a CPU 91 for executing various processes and controls in compliance with at least a predetermined control program, a system ROM 92 for storing the programs used to execute various processes and controls and the data required for various processes and controls, a RAM 93 for storing various data to act as a working area for various processes, and an I/F (interface) (not shown) for connecting the CPU 91 and various devices. Then, a console panel 94 used to input various settings and operation instructions is connected to the tension sensor 61, the camera 11, the driving motor 63, the longitudinally moving mechanism 36, the heating unit 40, and the moving mechanism 52 via the I/F.

In compliance with the programs stored in the ROM 92, the CPU 91 drives the driving motor 63 to cause the optical fiber F and the optical lens L to separate from each other after the optical fiber F and the optical lens L are jointed, and also executes the operation control to decide the jointed strength based on the tensile loading sensed at that time by the tension sensor 61.

In addition, in compliance with the programs stored in the ROM 92, the CPU 91 applies the tensile force to the optical fiber F and the optical lens L after the jointing, and then executes the operation control to decide again the jointed strength depending on whether or not change in the distance between the optical fiber F and the optical lens L exceeds a predetermined value when the tensile loading sensed by the tension sensor 61 does not satisfies a predetermined value.

Further, in compliance with the programs stored in the ROM 92, the CPU 91 applies the tensile force to the optical fiber F and the optical lens L after the jointing, and then executes the operation control to decide again the jointed strength depending on whether or not the sensed tensile loading becomes almost 0 or the separation between the optical fiber F and the optical lens L reaches a predetermined value.

Moreover, in compliance with the programs stored in the ROM 92, the CPU 91 executes the operation control to execute again the jointing operation when the jointed condition is not good as the result of decision. Also, the CPU 91 executes the operation control to repeat the above re-jointing operation by the predetermined number of times, in compliance with the programs stored in the ROM 92.

Also, in compliance with the programs stored in the ROM 92, the CPU 91 applies the control to the heating unit 40 to heat the top end portion of the optical fiber F up to the softening temperature prior to the jointing operation. That is, the CPU 91 for executing the predetermined program can function as a heating controlling unit.

In addition, in compliance with the programs stored in the ROM 92, the CPU 91 decides the curved property of the top end shape after the above optical fiber F is heated, and then executes the operation control to execute the heating operation once again when it is not decided that the top end shape is the curved surface. Also, the CPU 91 executes the operation control to repeat the above re-jointing operation by the predetermined number of times, in compliance with the programs stored in the ROM 92.

(Explanation of Operation of Jointing Apparatus)

Figure 5:
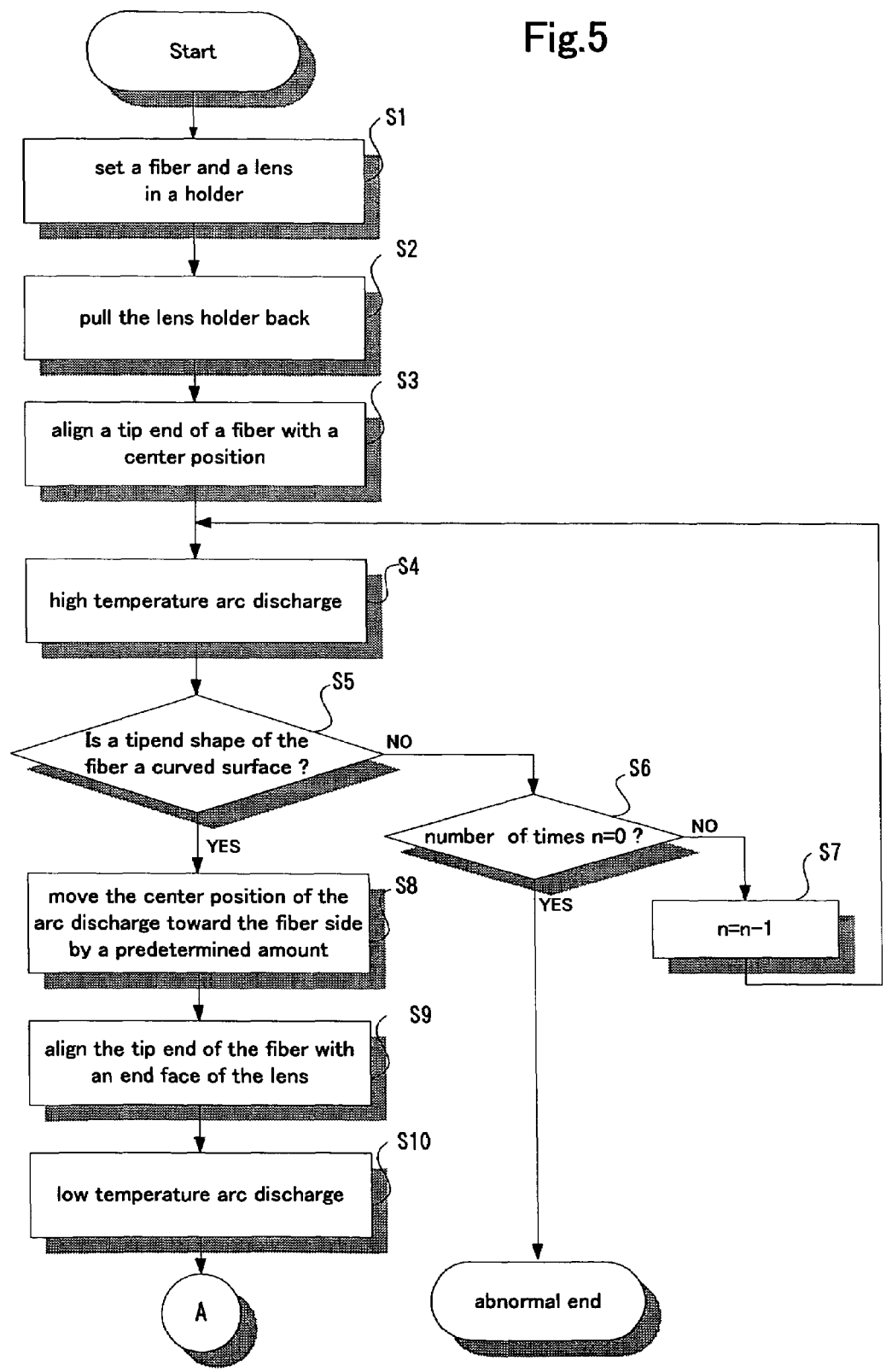
FIG. 5 is a flowchart showing operations of the jointing apparatus.
Figure 6:
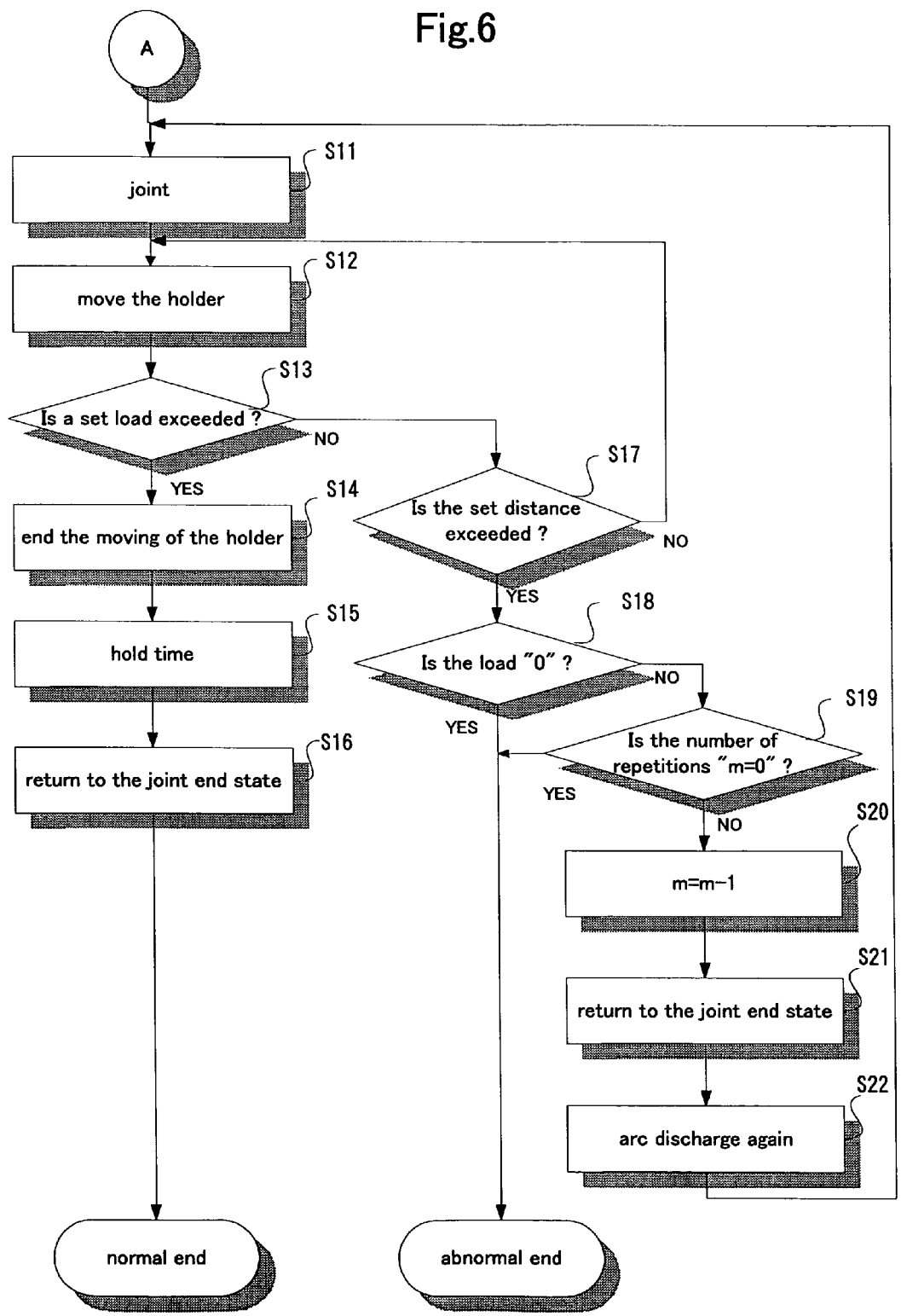
FIG. 6 is a flowchart continued from FIG. 5, showing the operations of the jointing apparatus.

A jointing operation of the optical fiber F and the optical lens L will be explained with reference to FIG. 5 and FIG. 6 hereunder. FIG. 5 and FIG. 6 are flowcharts showing operations of the jointing apparatus 10.

First, the optical lens L is set into the lens holding mechanism 20 by the manual operation, and also the optical fiber F is set into the fiber holding mechanism 30 by the manual operation (step S1). That is, the optical lens L is fitted by tightening the holding frames 23, and also the optical fiber F is fitted by inserting the fiber into the fiber holders 31, 32.

At this time, the registration of respective top end portions of the core wires F1 of the optical fiber F is executed. More particularly, the second fiber holder 32 is moved upward or downward while monitoring the expanded image picked up by the camera 11, and then the second fiber holder 32 is positioned to true up the end positions of the fiber. Then, two core wires F1 are fastened/fixed by the first fiber holder 31.

Then, when the start of the operation is input via a start switch provided to the console panel 94, the stopper is released and also the lens holder 21 is pulled back by the driving motor 63 to the retreat position on the opposite side to the optical fiber F (step S2).

Meanwhile, the operation controlling unit 90 controls the longitudinally moving mechanism 36 and the moving mechanism 52 to move/position them such that the target heating positions of the heating unit 40 is aligned with the top end positions of the core wires F1 of the optical fiber F (step S3). More specifically, the operation controlling unit 90 causes the camera 11 to pick up the images of the top end portions of the core wires F1 of the optical fiber F and the arc-discharge electrodes and process the picked-up image, and then applies the positioning control to the longitudinally moving mechanism 36 and the moving mechanism 52 such that the target heating positions coincide with the top end positions of the core wires F1.

After the optical fiber F is positioned, the arc discharge is executed by the heating unit 40 with the high output that can heat the fiber up to the softening point of the quartz glass (step S4). The arc discharge heats the end portion of the core wire of the optical fiber up to the softening point in order to obtain a rounded surface thereon.

Then, the camera 11 picks up the images of the top end portions of the core wires F1. The operation controlling unit 90 executes the image processing of the picked-up image, and decides whether or not the shape of top end faces of the core wires F1, viewed from the side, is a curved surface (step S5).

As the result, if at least one of the core wires F1 keeps a predetermined flatness, the predetermined number of repetitions n is checked (step S6). If n is not 0, the number n is decremented by 1 (step S7). Then, the process goes back to step S4 where the arc discharge is applied again to the core wires F1 by the heating unit 40. In contrast, if n=0 has already been gotten, it is decided that the arc discharge has been applied repeatedly by n times, and thus the abnormal terminating process is executed. At this time, a process of informing the operator of the fact that the operation is ended due to the failure may be executed by providing an informing unit or a displaying unit.

In contrast, in step S5, if it is decided that the shape of the top end faces of the core wires F1 of the optical fiber F is the curved surface, the arc-discharge electrodes are moved by the moving mechanism 52 to go away from the optical lens L by a predetermined distance (step S8).

Then, the lens holder 21 is moved toward the optical fiber F side by the driving motor 63. At this time, the camera 11 picks up the images of the top end portions of the core wires F1 and the arc-discharge electrodes, and the operation controlling unit 90 causes the driving motor 63 to drive based on the imaging process such that the jointed portion of the optical lens L comes into contact with the top end portions of the core wires F1 (step S9).

Then, when the optical lens L is positioned, the arc discharge is carried out at the target heating positions where the arc-discharge electrodes are separated from the jointed portion of the optical lens L by a predetermined distance (step S10). Since the heating output of the arc-discharge electrodes exceeds considerably the softening point of the optical lens L even though such heating output is suppressed to the lowest output that permits the apparatus to discharge, the heating temperature is adjusted by separating the target heating positions to control the distance. Accordingly, the optical lens L can be softened appropriately.

Then, the core wires F1 of the optical fiber F are moved toward the optical lens L side by the longitudinally moving mechanism 36. Thus, the core wires F1 are pushed into the jointed portion of the optical lens L, and then the core wires F1 are fastened with the cooling of the optical lens L and as a result the optical fiber F is jointed to the optical lens L (step S1).

After the jointing operation is completed, the joint-strength between the optical fiber F and the optical lens L is inspected. In other words, the driving motor 63 is driven to separate the optical lens L from the optical fiber F (step S12). If an output of the tension sensor 61 exceeds a predetermined load during such driving (step S13), the driving of the driving motor 63 is stopped and the position of the lens holder 21 is maintained (step S14). Then, the apparatus is held as it is for a predetermined time (step S15). Then, the driving motor 63 is driven in the reverse direction, and the lens holder 21 is returned to the original position (step S16). Thus, the jointing operation is completed.

In contrast, in step S13, if the output of the tension sensor 61 does not reach the predetermined load or more, it is decided based on an amount of drive of the driving motor 63 whether or not the lens holder 21 is moved by a predetermined distance (step S17). If the lens holder 21 is not moved, the process goes to step S13 where the drive of the driving motor 63 is still continued.

Also, if the lens holder 21 is moved by the predetermined distance, it is decided again by checking the output of the tension sensor 61 whether or not the load is equal to almost 0 (step S18).

If the load is equal or close to 0, it is decided that the optical fiber F comes off from the optical lens L, and then the abnormal terminating process is executed. At this time, the process of informing the operator of the fact that the operation is ended due to the failure may be executed by providing an informing unit or a displaying unit.

Then, if the load is not equal or close to 0, it is checked whether or not the predetermined number of repetitions m is equal too (step S19). Then, if the number m is not equal to 0, the number m is decremented by 1 (step S20). Then, the driving motor 63 is driven in the opposite direction, then the lens holder 21 is returned to the original position (step S21), and then the arc discharge is executed again by the heating unit 40 (step S22). Then, the process goes back to step S11 where the optical fiber F is pushed into the optical lens L. If the number m=0 has already been attained, it is decided that the arc discharge is repeated by the number of times m and the abnormal terminating process is carried out.

Advantages of the Embodiment

Since the jointing apparatus 10 having the above configuration can get the mutual joint by pushing the optical fiber F into the softened optical lens L, the adhesive can be omitted and also the degradation of the optical characteristics due to the temperature rise can be avoided.

Also, since the optical lens L is heated merely to its softening point, the mutual joint can be attained not to heat the optical fiber F to the higher temperature than the softening point and also reduction of power consumption can be achieved.

Also, since the adhesive is not needed, a margin for the adhesive can be omitted, the guide such as the capillary, or the like for fixing the optical fiber F can be omitted, and the operation of polishing the end faces of the fiber together with the guide can be neglected. As a result, the cost performance and the productivity can be improved because of the reduction in the number of parts and the number of working process.

In addition, since the joint can be obtained by pushing the optical fiber F into the softened optical lens L, no space is formed between the optical fiber F and the optical lens L. Therefore, the entering of the foreign matter can be avoided and the optical characteristic can be maintained highly.

Also, since the structure for maintaining the clearance space can be omitted and also the antireflection coating on the end face can be omitted, the lower cost and the smaller size can be achieved.

Further, unlike the method of fusing both the optical fiber F and the optical lens L to joint, the optical fiber F and the optical lens L can be jointed irrespective of a difference of mutual softening temperatures.

Also, since a coefficient of linear expansion of the optical lens L is larger than the optical fiber F, the pushed-in optical fiber F is fastened by the optical lens L from the surrounding and thus the joint strength can be improved.

Also, since the jointing apparatus 10 adjusts an amount of heat in response to the distance from the target heating point of the arc discharge to the jointed portion of the optical lens L, the circuit for adjusting the output intensity of the arc discharge can be omitted or simplified, and thus the overall apparatus can be simplified and the productivity can be improved.

In addition, since the jointing apparatus 10 executes the registration of the end faces of the core wires of the two-core optical fiber by adjusting the mutual positions of two fiber holders 31, 32, the polishing operation can be omitted and the registration can be executed with the simple operation. Therefore, the workability can be improved and the guide, etc. can be omitted and thus the cost reduction can be achieved.

Further, the jointing apparatus 10 has the joint-strength inspecting mechanism 60 for applying the tensile force between the optical lens L and the optical fiber F and sensing the tensile force, and also the operation controlling unit 90 inspects the jointed state between the optical lens L and the optical fiber F based on the sensed tensile force. Therefore, the defective joint can be easily found.

Also, the operation controlling unit 90 executes the operation control based on the decision of the defective joint made by the joint-strength inspecting mechanism to cause the heating unit 40 to heat again. Therefore, the reliability of the jointing operation between the optical lens L and the optical fiber F can be improved.

Furthermore, since the operation controlling unit 90 executes the operation control to heat the jointed end portions of the optical fiber F up to the softening temperature prior to the jointing operation, the end portions of the core wires F1 of the optical fiber F can be deformed like the curved surface. Thus, the diffused reflection of the return light by the edge reflection of the optical fiber F can be generated and the degradation of the optical characteristics after the jointing operation can be suppressed. Also, since a part of two aligned core wires F1 is melted by the heating to enter into the space between the core wires, two core wires can be pasted together by the capillary phenomenon. Therefore, two core wires can be kept in their aligned state and reduction in diameter of the end portions of the optical fiber can be achieved.

The operation of registering the top ends of two core wires F1 of the optical fiber F may be executed by providing a driving motor as a driving source for moving the second fiber holder 32 vertically to the holder-position adjusting mechanism 33 and then controlling the driving motor by the operation controlling unit 90. In other words, the operation controlling unit 90 may discriminate its inconsistent state by executing the image processing based on the images picked up by the camera 11, then may decide the upward or downward driving direction of the driving motor in response to which one of the core wires F1 is protruded and also execute the control to move the second fiber holder 32 until both end faces agrees with each other.

In the above joint-strength inspecting mechanism 60, the driving motor 63 is employed as the driving source to apply the tensile force between the optical fiber F and the optical lens L. In this case, when the to-be-applied tensile force has already been known, the solenoid, or the like using the magnetic force, the actuator using the pneumatics, the hydraulics, or the like may be employed in place of the driving motor 63. As a result, the mechanism portions can be simplified and also reduction in size and cost and improvement in the productivity can be attained.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

In the invention set forth in the first aspect of the present invention, since the mutual jointing is obtained by pushing the optical fiber into the softened optical lens, the adhesive can be omitted and also the degradation of the optical characteristics due to the temperature rise can be avoided.

Also, since the optical lens is heated merely to its softening point, the optical fiber may not be heated to the higher temperature than the softening point of the optical fiber and also reduction of the heating output can be achieved.

Also, since the deformation is not caused in the tip face of the optical fiber, the optical characteristics of the optical fiber, as designed, can be maintained.

Also, since the adhesive is not needed, a margin for the adhesive can be omitted, the guide such as the capillary, or the like for fixing the optical fiber F can be omitted, and the operation of polishing the end faces of the fiber together with the guide can be neglected. As a result, the cost performance and the productivity can be improved because of the reduction in the number of parts and the number of working process.

In addition, since the method of pushing the optical fiber into the softened optical lens is employed, no space is formed between the optical fiber and the optical lens. Therefore, the entering of the foreign matter can be avoided and the optical characteristic can be maintained highly.

Also, since the structure for maintaining the clearance space can be omitted and also the antireflection coating on the end face can be omitted, the lower in the cost and the smaller in the size can be achieved.

Further, unlike the method of fusing both the optical fiber F and the optical lens to joint, the optical fiber and the optical lens can be jointed irrespective of a difference of mutual softening temperatures.

Also, since a linear expansion coefficient of the optical lens is larger than the optical fiber, the pushed-in optical fiber is fastened by the optical lens from the surrounding and thus the joint strength can be improved.

According to the present invention, since the heating point by the arc discharge is separated from the jointed portion of the optical lens, the jointed portion of the optical lens can be heated at the temperature that responds to the separated distance. Therefore, the device for adjusting the output strength by the discharge, and the like can be omitted, and the heating temperature of the optical lens can be adjusted simply.

Further, according to the seventh aspect of the present invention, since the target heating position of the heating unit can be adjusted by the heating-position adjusting unit, the heating temperature of the jointed portion of the optical lens can be adjusted in response to the separated distance. Therefore, the heating to soften only the jointed portion of the optical lens can be applied by the jointing apparatus, and the operation of jointing the optical fiber and the optical lens can be made easily by pushing the end portion of the optical fiber into the jointed portion of the optical lens after such heating.

Also, since the adhesive is not needed, the same effects as those in the first aspect of the present invention can be achieved.

Also, since the optical lens is heated merely to its softening point, the optical fiber may not be heated to the higher temperature than the softening point of the optical fiber and also reduction of the heating output can be achieved.

Also, since the deformation is not caused in the tip face of the optical fiber, the optical characteristics of the optical fiber, as designed, can be maintained.

Also, since the linear expansion coefficient of the optical lens is larger than the optical fiber, the pushed-in optical fiber is fastened by the optical lens from the surrounding and thus the joint strength can be improved.

In the eighth aspect of the present invention, since the registration of the end faces of the core wires of the two-core optical fiber is executed by adjusting the positions of two fiber holders, the polishing operation can be omitted and the registration can be executed with the simple operation. Therefore, the workability can be improved and the guide, etc. can be omitted and thus the cost reduction can be achieved.

In the ninth aspect of the present invention, the joint-strength inspecting mechanism for inspecting the jointed condition between the optical lens and the optical fiber based on the tensile force applied between the optical lens and the optical fiber is provided. Therefore, the defective joint can be easily found.

In the tenth aspect of the present invention, the operation controlling unit for causing the heating unit based on the decision of the defective joint made by the joint-strength inspecting mechanism to heat the optical lens again is provided. Therefore, the reliability of the jointing operation between the optical lens and the optical fiber can be improved.

In the eleventh aspect of the present invention, since the jointed end portions of the optical fiber is heated previously up to the softening temperature, the end portions of the optical fiber can be deformed into the curved surface. Thus, the diffused reflection of the return light by the edge reflection of the optical fiber can be generated and the degradation of the optical characteristics after the jointing operation can be suppressed.

Also, since a part of two aligned core wires is melted in the two-core optical fiber to enter into the space between the core wires, two core wires can be pasted together by the capillary phenomenon. Therefore, two core wires can be kept in their aligned state and also reduction in diameter of the end portions of the optical fiber can be achieved.

What is claimed is:

1. A method for jointing an optical fiber with an optical lens, comprising the steps of:
   heating an end portion of a core wire of the optical fiber up to a softening point of the optical fiber so that a rounded surface is formed at the end portion of the core wire;
   heating a jointed portion of the optical lens so as not to exceed a softening point of the optical lens;
   pushing the core wire of the optical fiber, in which the rounded surface is formed at the end portion, into the softened jointed portion of the optical lens; and
   cooling the jointed portion of the optical lens so that the core wire of the optical fiber is fastened by the jointed portion of the optical lens and they are joined together;
   wherein the softening point of the optical fiber is higher than the softening point of the optical lens.

2. The method of claim 1, further comprising, prior to pushing the core wire of the optical fiber into the softened jointed portion of the optical lens,
   arranging the end portion of the optical fiber and the joint portion of the optical lens to be opposed to each other; and
   softening the optical lens by a heat source that is located apart from the joint portion of the optical lens and the optical fiber.

3. The method of claim 2, wherein the heat source is an arc discharge.

4. The method of claim 2, wherein the heat source is located apart from the optical fiber and the optical lens in a radial direction of a longitudinal axis of the optical fiber.

5. The method of claim 1, further comprising:
   applying a tensile force on the jointed optical fiber and the optical lens in a direction to stretch the optical fiber and the optical lens; and
   inspecting a jointed condition between the optical lens and the optical fiber based on the tensile force applied thereto.

6. The method of claim 1, further comprising heating the end portion of the core wire of the optical fiber until it is determined that the end portion becomes the rounded surface.

7. The method of claim 1, further comprising moving the optical lens to a position where the end portion of the core wire is in contact with the optical lens after heating the end portion of the core wire of the optical fiber.

* * * * *